June 27, 1967 E. O. BLODGETT 3,327,917

RECORD MEDIUM FEED STRUCTURE

Filed Aug. 27, 1965 2 Sheets-Sheet 1

INVENTOR.
EDWIN O. BLODGETT

BY John A. Harvey

ATTORNEY

INVENTOR.
EDWIN O. BLODGETT
BY John A. Harvey
ATTORNEY

United States Patent Office 3,327,917
Patented June 27, 1967

3,327,917
RECORD MEDIUM FEED STRUCTURE

Edwin O. Blodgett, Rochester, N.Y., assignor to Friden, Inc., a corporation of Delaware Filed Aug. 27, 1965, Ser. No. 483,196
7 Claims. (Cl. 226—141)

ABSTRACT OF THE DISCLOSURE

In an apparatus for reading successive items of recorded information, recorded in a web-form record medium as successive code-bit columns in which all code bits of each column are concurrently read, a record medium feed structure includes a cam and cam-follower reciprocal drive of a stepping pawl which is spring biased to engage the teeth of a record-medium step-drive ratchet wheel. A maximum range of reciprocal drive of the pawl is provided to effect a maximum multi-tooth drive of the ratchet wheel during each pawl reciprocation and thereby move the record medium over a maximum step displacement corresponding to a preselected integral number of code columns. A range-control member is selectably movable between two positions, a first of these positions permitting the maximum range of pawl motion to effect a maximum step displacement of the record medium and the second of the positions abruptly arresting the pawl motion at an intermediate point in its maximum range of reciprocal drive to effect an intermediate range of pawl drive of the ratchet wheel and thereby an intermediate step displacement of the record medium corresponding to a lesser integral number of code columns.

This invention relates to devices for translating information from elongated web-form recording media having the information coded thereon in the form of successive groups of code bits regularly spaced by groups along the longitudinal dimension thereof.

The invention has particular utility in the tape feed structure of punched tape readers, and will be described in that environment.

Punched tape has information recorded thereon in the form of groups of code-bit apertures regularly spaced by groups longitudinally of the tape. Use of the present invention in the tape-feed structure of a tape reader enables advance of the tape through the reader either at a normal reading rate or at an accelerated search rate for searching the tape for recorded addresses used to identify blocks of recorded data.

A punched tape as used for recording information in a form useful in various types of information-handling and utilizing systems typically records each of a succession of information items as a succession of code groups arranged in equally spaced transverse columns of punched code holes. Each hole constitutes a code bit, and the column is divided into code-bit channels so that the positions of the holes in each code group are representative of the information item recorded by used of an appropriate punch code. In a conventional punched tape reader, the tape is step advanced through the reader code group by code group past a reading locality where each code group is read by an array of aligned reading pins equal in number to the number of code channels used. The step-wise tape feeding movement halts as each successive code group passes the reading locality, so that the reading pins can sense the presence or absence of holes in each channel in each code group. The sensed presence or absence of code apertures, as represented by mechanical displacement of the reading pins, is transmitted electrically to an appropriate device for utilization as desired.

A widespread field of application for data processing systems utilizing punched tape recording media is in the operation and control of automatic printing machines such as typewriters. A selective data translating system employing punched-tape record media for operation of a typewriter is disclosed in United States Patent No. 3,025,941 issued Mar. 20, 1962 to Edwin O. Blodgett, et al. In this system, blocks of data (each typically comprising a large number of successive code groups) are punch recorded in a tape and each block of data is preceded by a numeric address code. This punched tape is read by a search reader. The address of desired data to be read out by the search reader for typing or recording or both is supplied either manually (as by manual actuation of address keys) or by another punched tape reader or edge-punched tabulating card reader which forms an integral unit of the typewriter. The address if manually supplied is retained by the manually actuated setting of the address keys, or if supplied from a punched tape or edge-punched tabulating card is retained in storage by address storage relays. Thereafter the system automatically operates the search reader to search its data-containing punched tape at high reading rates (that is, at rates significantly higher than the normal reading rate of the reader associated with the typewriter). The search reader either halts when the desired data is located and while this reader awaits access to the typewriter, or otherwise immediately reads the addressed block of data to the typewriter for reproduction thereby.

It is an object of the present invention to provide a new and improved record medium feed structure for a reader adapted to read elongated web-forming recording media as exemplified by punched tape, and one having particular utility in the search reader of the selective data translating system of the aforementioned Blodgett, et al. patent.

Another object of the invention is to provide a punched-tape feed structure enabling the tape to be advanced through a reader either by successive code groups or by alternate code groups of the tape, whereby tape search operation is effected at a rate of tape feed twice as fast as the successive-code feed rate of the reader.

A still further object is to provide an improved punched-tape feed structure for a punched-tape reader and one of simple yet precise operation assuring advance of the tape at either of two controllably selectable feed rates.

Further objects and advantages of the invention will be apparent from the detailed description hereinbelow set forth, together with the accompanying drawings, wherein.

Figure 1:
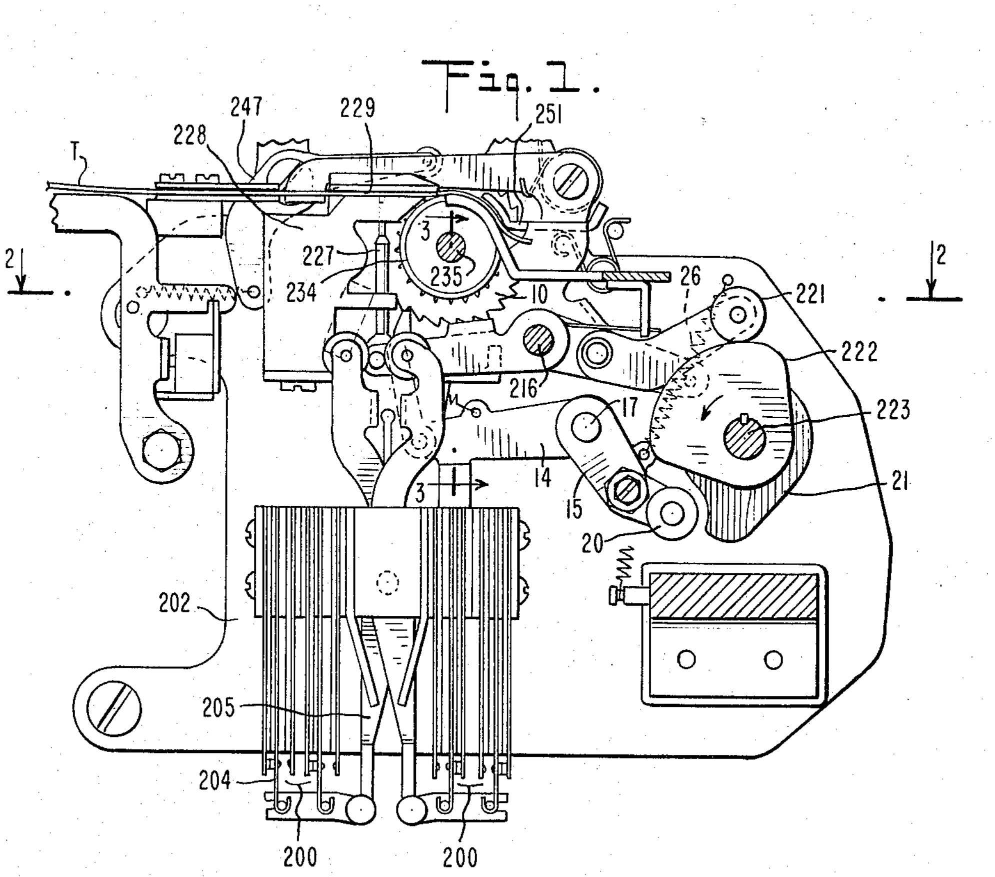
FIG. 1 is a side elevational view of a punched tape reader unit incorporating a tape feed structure embodying the present invention in a particular form.
Figure 2:
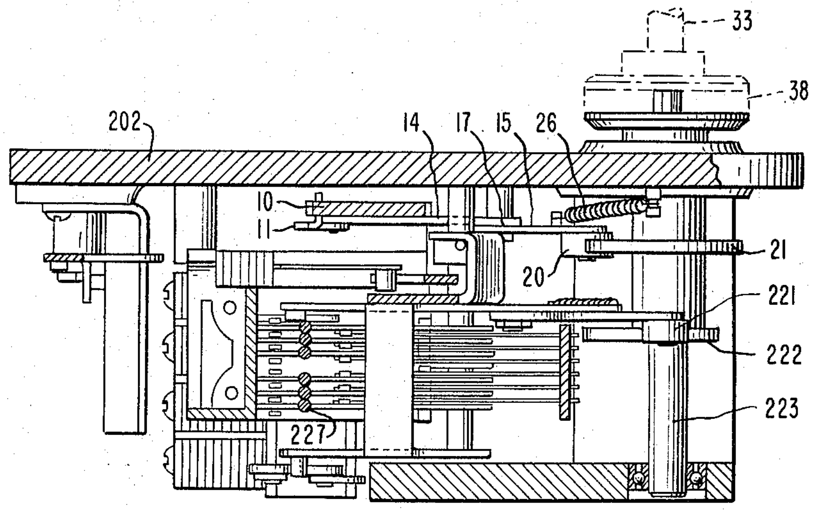
FIG. 2 is a plan view of the reader unit of FIG. 1 taken along the plane 2—2 of FIG. 1.

Referring first to FIGS. 1 and 2, there is shown the general organization and arrangement of a punched tape reader in which the tape feeding mechanism of the present invention is incorporated. The reader unit in its illustrated form is of the type shown and described in detail in United States Patent No. 2,927,158, issued Mar. 1, 1960, to Edwin O. Blodgett and entitled Code-Form Converter, to which reference is made for a more complete understanding of the mechanical construction and operation of the reader. In view of the detailed description of the reader unit in the last-mentioned Blodgett patent, the unit will be described only generally herein, and for convenience of reference in this following general description the elements of the reader will be identified by the same reference numerals used to designate like elements in the last-mentioned Blodgett patent.

As described in the Blodgett patent, the reader structure shown is adapted to read a six-channel code in a punched tape T which is advanced (from left to right as seen in FIGS. 1 and 2) through a tape feed throat 229 in guide block 228 supported by base casting 202. A plurality of reader pins 227, corresponding in number to the maximum number of code bits in any code group of the tape (in this case six) are arranged in aligned relation transverse to the direction of tape feed at a tape reading locality in throat 229 and guided for vertical reciprocatory motion by guide block 228, for sensing presence or absence of perforations in each code bit group which is presented in register with the pins 227.

The reader unit includes a plurality of reader contact transfer assemblies 200 having movable transfer contacts 204 operated by actuators 205 which correspond in number to the maximum number of code bits in any code bit group and are controlled by individual ones of the reader pins 227. This control takes place once in each reciprocating cycle of the reader pins by control actuation supplied by reader drive cam 222 transmitted through cam follower structure 221 operating interposer bail assembly structure 216. If a reader pin finds a code perforation in the tape being read, it permits movement of its associated actuator 205 to operate the associated contact assembly 200 whereas if it senses no perforation its associated contact assembly remains unoperated.

The code groups of the tape are arranged as equally spaced transverse columns of perforations which are read column-by-column as the tape is advanced longitudinally through the throat 229. To facilitate such advance, the tape is also provided along its length with sprocket feed holes which are positionally correlated with the successive code columns and are engaged by the pins of a tape feed pin wheel 234. The wheel 234 is mounted on a shaft 235 rotatably supported in a front and back side casting of the reader structure and is disposed so that the pin-bearing periphery of the wheel is tangent to the path of tape advance. The tape is held in contact with the wheel pins by means of an arm 251 which is displaceable to permit threading of the tape at the start of operation. For drive of the pin wheel, the shaft 235 is operatively interconnected to a camshaft 223 (which also carries the above-mentioned reader drive cam 222) by a tape feed structure in accordance with the present invention and hereinafter more fully described. Suitable motorized drive means (not shown) is provided for operating the reader unit; the drive shaft 33 (FIG. 2) of such drive means is coupled by a coupler 38 to the camshaft 223 to effect rotation of the latter.

As explained in detail below, the structure interconnecting the camshaft 223 with the shaft 235 is arranged to produce rotation of the pin wheel 234 (in clockwise direction as seen in FIG. 1), upon rotation of the camshaft, and more particularly to advance the pin wheel 234 by a preselected number of wheel pins once during each complete revolution of the camshaft. In normal reader operation, to afford reading of each successive column of perforations on the tape, the pin wheel 234 is indexed clockwise, one pin at a time, once during each camshaft cycle, to advance the tape forward by an amount corresponding to the distance between successive columns of code perforations. This indexing occurs during the terminal portion of the camshaft cycle, whereas during the initial portion of the cycle the tape remains stationary for reading with the column of perforations to be read located in the throat 229 in register with the reading pins 227. Control actuation of reader pins 227 is supplied by reader drive cam 222 during such initial portion of the camshaft cycle, and a feed cam presently to be described is then effective during the terminal portion of the cycle of camshaft rotation to index the pin wheel 234 and move the next succeeding column of perforations into register with the pins 227 and the reading operation is repeated.

As incorporated in the illustrated reader unit, the tape feeding structure of the present invention (particularly shown in FIGS. 3–5) includes a ratchet wheel 10 fixed on shaft 235 at a locality adjacent to the wall of casting 202 and having circumferential teeth corresponding in number to the tape feed pins on wheel 234 so that indexing of the ratchet wheel by one ratchet tooth advances the pin wheel by one pin and hence moves the tape forward one code column. A pawl 11, disposed beneath ratchet wheel 10 and arranged as hereinafter described to undergo substantially vertical reciprocating motion, periodically engages the teeth of the ratchet wheel to effect rotation of the latter wheel (in clockwise direction as seen in FIG. 4) thereby to rotate shaft 235 and pin wheel 234 secured to the shaft for step-by-step feeding of the tape through the reader unit.

Pawl 11 is secured at its lower extremity by pivot 12 to the free end of an arm 14 which, together with a second arm 15, forms a downwardly-opening bell crank 16 pivotally mounted to the casting 202 at pivot point 17 for rocking motion about such pivot point in a vertical plane. On the free end of arm 15 (this being the end of the bell crank remote from pivot 12) there is mounted a cam follower 20 disposed and adapted to engage the peripheral surface of a tape feed cam 21 which is mounted on and rotated by the driven cam shaft 223 in counterclockwise direction as seen in FIG. 4.

As will be apparent from the drawing, when the high portion 24 of the surface of cam 21 engages the cam follower 20, the latter is forced downwardly (to the position indicated by broken line 25 in FIG. 4) causing an upward rocking motion of arm 14 which in turn moves the pawl 11 upwardly in engagement with the teeth of ratchet wheel 10 thereby effecting the described clockwise rotation of the ratchet wheel. A spring 26, connected between the base casting 202 and arm 15, biases the cam follower toward continuous engagement with the cam surface. After the high portion 24 of cam 21 passes the cam follower 20, the latter moves under bias of the spring 26 in a direction tending to follow the low portion of the cam and in doing so causes the arm 14 to rock downwardly and bring the pawl 62 downward into position to begin the next cycle of tape feeding operation.

For assured continuous contact of pawl 11 with the ratchet wheel periphery, the pawl is biased toward engagement with the ratchet teeth by means of a spring 27 connected between the pawl and an adjacent projection 28 on arm 14. In addition, a stop member 29 is mounted on the base casting 202 adjacent to the upper limit of motion of pawl 11 and is shaped and positioned to wedge or jam the pawl at such upper limit of its movement against the teeth of the ratchet wheel 10 thus to assure a positive stop of the pawl without overtravel.

The bell crank 16, cam follower 20 and cam 21 are disposed in such position relative to each other that, in the absence of feed control provided by a stop means, presently to be described, the cam follower 20 follows the surface of the cam 21 to the lowest point on the latter. This causes pawl 11 to move downwardly from its upper limit of travel by a distance equal to two teeth of ratchet wheel 10, with the result that the next upward motion of the pawl advances the ratchet wheel by an angular distance corresponding to two teeth. Such motion of the ratchet wheel, with indexing of the pin wheel 234 forward by two pins, advances the tape by a distance equal to two columns of code perforations on each feed cycle; hence the tape reading pins 227 read only alternate columns of code perforations.

Further in accordance with the invention, there is provided a feed control means comprising a bell-crank stop arrangement generally designated 30. The latter is operable either so to limit the downward travel of the pawl 11 as to index the ratchet wheel one tooth and thus feed the tape forwardly one column of code perforations per cycle of the feed cam 21 or to permit the cam follower 20 to follow the surface of the cam 21 to its lowest point as described above and thus feed the tape forwardly two code columns per feed cycle. This stop arrangement includes a stop member 31 pivotally mounted at 32 adjacent its lower end to a support yoke 33 secured to the wall of casting 202 to permit angular displacement of the member 31 into and out of the path of rocking motion of the bell crank 16. Stop member 31 is biased by means of a leaf spring 34 toward the wall of casting 202 so as to be normally disposed in vertical position with its upper end abutting a projection 35 on the wall of the casting 202. In this vertical position, the stop member 31 is engaged by a stop projection 36 on the lower surface of bell crank arm 14 adjacent to pivot 12 to restrict downward movement of arm 14. Specifically, and as shown in FIG. 4, the stop member 31 in its vertical position so arrests the downward movement of the arm 14 that the cam follower 20 is held out of engagement with the surface of the cam 21 over a low-point region thereof to limit the downward travel of pawl 11 to a distance equal to only a single tooth of the ratchet wheel, so that each upward stroke of the pawl indexes the ratchet wheel 10 by only a single tooth. Accordingly, when the stop 31 is in the described position for engaging bell crank arm 14 the pin wheel is indexed one pin per cam cycle, feeding the tape at a rate of one code column per cycle.

As more particularly shown in FIG. 3, a pin 37 projects through the wall of casting 202 behind the stop member 31, being supported by the casting wall for axially directed translational movement toward and away from the later stop member, and bearing a forward stop flange **37*a* and a rearward stop flange 37*b* for limiting its axial movement. The forward end of pin 37 engages the rear face of stop member 31 at a locality above pivot point 32 so that forward movement of pin 37 swings the stop member 31 away from its vertical position (as indicated by broken line 31*a* in FIG. 3) against the force of biasing spring 34. The pin when fully retracted (with forward stop flange 37*a* engaging the wall of casting 202) permits the stop member 31 to be held by spring 34 in the illustrated vertical position against projection 35 for limiting the downward movement of pawl 11 as described above. The rear stop flange 37*b* of the pin is so located that when the pin is moved forward as far as permitted by this flange, it swings the stop member 31 away from vertical position by a distance sufficient to provide clearance for descent of arm 14 and pawl 11** to the position corresponding to the lowest portion of the cam surface.

In other words, stop member 31 when in the vertical position intercepts bell crank arm 14 at an intermediate locality in its path of travel for limiting the reciprocation of pawl 11 to a restricted range of motion less than the maximum range of motion provided by continuous engagement of follower 20 with cam 21 throughout the cam cycle, and this stop member 31 is movable from the vertical position (by pin 37) to a second position **31*a*, out of the way of arm 14 permitting reciprocation of the pawl 11** through such maximum range of motion. In the described embodiment the values of the restricted and maximum ranges of motion of the pawl are selected to provide step advance of the tape, on each cycle, through distances equal respectively to the distance between successive code groups and the distance between alternate code groups on the tape.

Also included in the structure is an electromagnet 40 supported by a bracket 42 rearwardly of the wall of casting 202. A rocker arm 44 of magnetic material, pivoted at 45 and having an upper free end (above pivot 45) adjacent the electromagnet core 46 and a lower free end 47 engaging the rearward extremity of pin 37, is movable under control of the electromagnet to effect advance of the pin 37 for moving the stop member 31 out of the way of arm 14. Specifically, when the electromagnet 40 is not energized, the upper free end of the rocker arm 44 is freely movable away from core 46 so that under the force of spring 34 the pin 37 is forced to the rearward limit of its range of positions, rocking the lower end 47 of arm 44 rearwardly, stop member 31 being then in operative position to limit the descent of bell crank arm 14. Upon energization of the electromagnet 40, the upper end of arm 44 is attracted to the magnet core 46, swinging the lower end 47 of this arm forwardly and moving the pin forward against the force of spring 34 to push the stop member 31 out of the way of bell crank arm 14. Accordingly, while magnet 40 is energized, the cam follower 20 can engage and follow the surface of cam 21 over the full cycle of cam rotation with the result that pawl 11 drops by a distance equal to two ratchet teeth at the low point of each cam cycle and correspondingly advances the ratchet wheel by two ratchet teeth at the high point of each cycle.

Figures 3, 5:
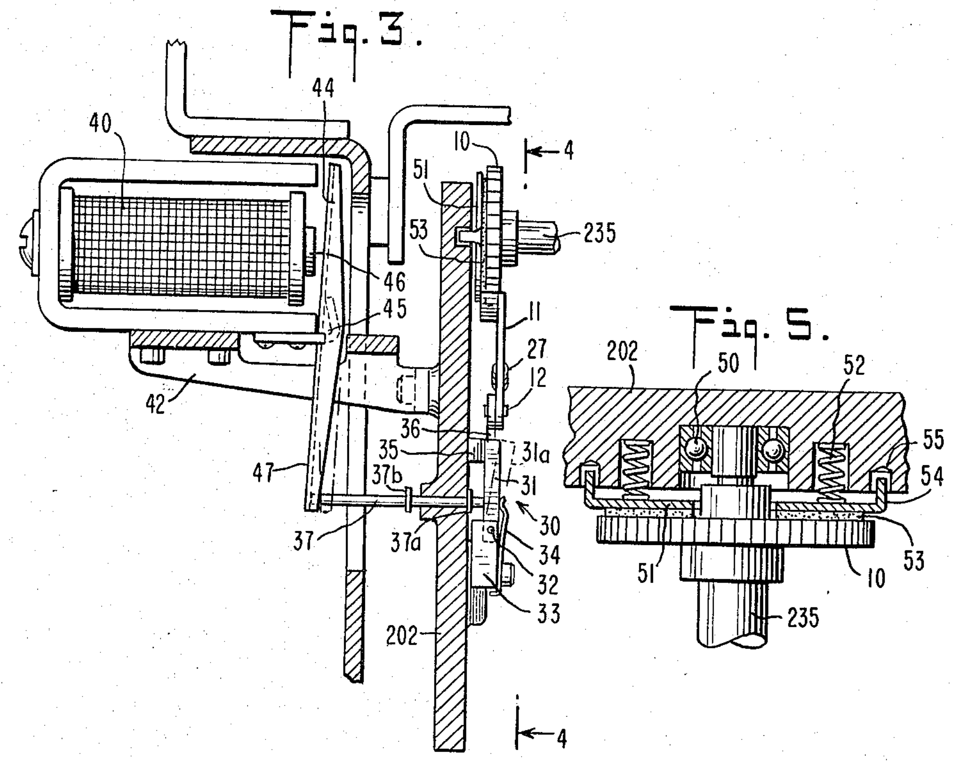
FIG. 3 is an elevational view of the tape feed structure of the present invention taken along the plane 3—3 of FIG. 1.
FIG. 5 is a fragmentary sectional view of the mounting of the ratchet wheel of the tape feed structure taken along the plane 5—5 of FIG. 4.
Figure 4:
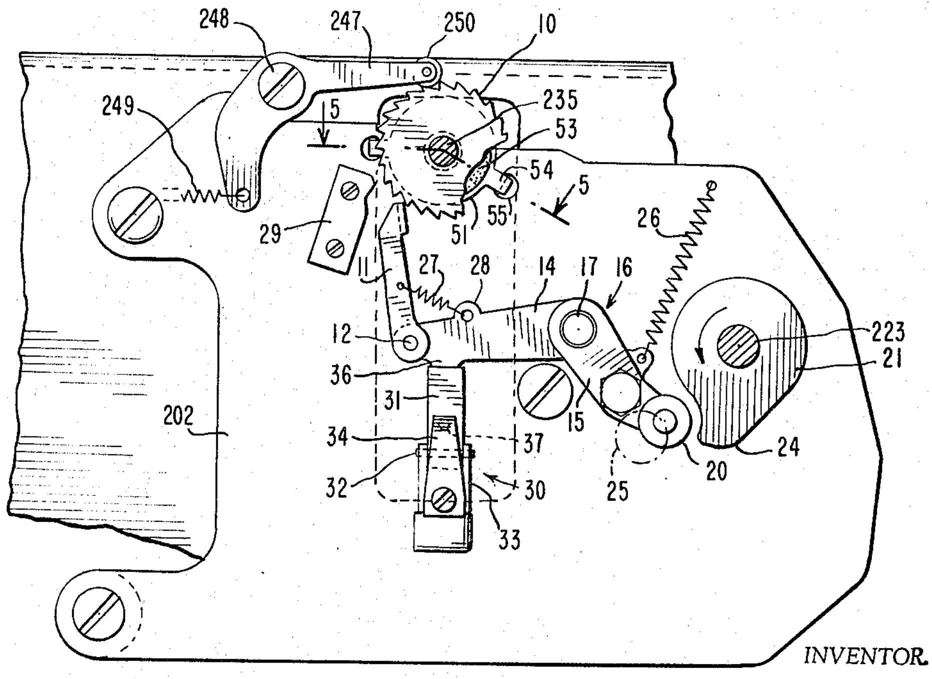
FIG. 4 is an elevational view of the tape feed structure taken along the plane 4—4 of FIG. 3.

To prevent any tendency of the ratchet wheel 10 to overshoot or move excessively in response to the force supplied by pawl 11, the ratchet wheel may be provided with brake means as shown in FIG. 5. The ratchet wheel is as stated, secured to shaft 235 which is journalled by ball bearings 50 in the wall of casting 202. Mounted between the ratchet wheel and the latter wall is a brake disk 51 biased by springs 52 toward engagement with a friction ring 53 affixed to the rear surface of the ratchet wheel 10, brake disk 51 being held against rotation with ratchet wheel 10 by the engagement of rearwardly projecting ears 54 with closely fitting cooperating recesses 55 in the casting wall. The force of springs 52 presses the stationary brake disk 51 into frictional engagement with the friction ring 53, and the ratchet wheel 10 is thereby effectively restrained against undesired rotational movement.

If further restraint of the ratchet wheel is desired, there may also be provided a feed ratchet wheel detent 247 as shown in the aforementioned Blodgett Patent No. 2,927,158, pivoted at 248 on a stud fixed to the support casting 202 and biased clockwise by a tension spring 249 to cause engagement of a roller 250 carried at the end of arm 247 with the teeth of the ratchet wheel 10. This detent structure provides a stabilizing action for the rotary operation of the ratchet wheel and consequently of the tape feed pin wheel 234.

The operation of the described tape feed structure will now be readily apparent. For normal tape reading operation, when it is desired to advance the tape through the reader one column at a time for reading of each successive code group, the electromagnet 40 is maintained in de-energized condition so that the force of spring 34 maintains the stop member 31 in position to limit the downward movement of bell crank arm 14. Thus as cam 21 is rotated by cam shaft 223, the reciprocation of pawl 11 is limited by member 31 to a distance equal to a single ratchet tooth per cam cycle and thereby to indexing of the ratchet wheel one tooth per cycle for advance of the tape at the desired rate of one column per cycle.

However, when it is desired to search the tape at higher speed for a supplied address code preceding a block of data desired to be read, the electromagnet is energized, moving arm 44 so as to force pin 37 forwardly and thereby to move stop member 31 out of the way of bell crank arm 14. The cam follower 20 is then permitted to follow the surface of cam 21 throughout the cam cycle. Pawl 11 accordingly descends through a distance equal to two ratchet teeth during the low portion of the cam cycle and correspondingly advances the ratchet wheel by two teeth during the high portion of each cycle. The tape in the reader is then moved forward two columns at a time so that only alternate columns of perforations are read by the reading pins 227 and associated instrumentalities. In this way, with the same cam speed and operating speed of the reading elements maintained, the tape advances through the reader unit twice as fast as in normal reading operation.

For return to normal reading operation, the electromagnet 40 is de-energized, releasing arm 44 and restoring stop member 31 to its vertical position.

Since in the search-reading operation provided by the present invention, only alternate code groups are read by the reader while searching for an address code, each block of recorder data in the tape must be preceded by two successive identical address codes so that one of these addresses will always appear as the alternate code read by the reader. The resultant loss of recording capacity in the tape by reason of the recording of two successive address codes is insignificant in practice since each block of data will usually be comprised by a large number of recorded code groups.

As will be appreciated, provision of the electromagnet 40 as the control element for selecting the rate of tape feed enables fully automatic operation of the reader at the normal and accelerated rates of tape advance, in a system as shown for example in the aforementioned Blodgett, et al. Patent No. 3,025,941; that is to say, energization and deenergization of the electromagnet can be effected automatically and in known manner in response to signals from other components of the system for search or reading operation by the tape reader.

It is to be understood that the invention is not limited to the specific features and embodiments herein shown and described but may be carried out in other ways without departure from its spirit.

I claim:

1. In apparatus for translating information from an elongated web-form recording medium having said information coded thereon in groups of code bits regularly spaced by groups along the longitudinal dimension of said medium, structure for advancing said medium past a reading locality to bring code bit groups of said medium successively into register with said locality, said structure comprising, in combination, a reciprocating member having a maximum range of motion for moving said medium stepwise past said reading locality; medium-engaging means driven by said reciprocating member for effecting step advance of said medium past said reading locality by a step value proportional to the range of motion of said member in each reciprocal cycle thereof; advance control means movable into a first position abruptly arresting the movement of said member at an intermediate point in said maximum range of motion thereof to limit reciprocation of said member to a restricted range of motion less than said maximum range of motion and movable to a second position out of movement arresting relation to said member to permit reciprocation of said member through said maximum range of motion; and means for moving said control means between said first and second positions thereof; the values of said restricted and maximum ranges of motion of said member being selected to provide step advance of said medium through distances respectively equal to the distances between a first integral number and a second, larger integral number of code bit groups on said medium.

2. In apparatus for translating information from an elongated web-form recording medium having said information coded thereon in groups of code bits regularly spaced by groups along the longitudinal dimension of said medium, structure for advancing said medium past a reading locality to bring code bit groups of said medium successively into register with said locality, said structure comprising, in combination, a reciprocating member having a maximum range of motion in a path of reciprocation for moving said medium stepwise past said reading locality; medium-engaging means driven by said reciprocating member for effecting step advance of said medium past said reading locality by a step value proportional to the range of motion of said member in each reciprocal cycle thereof; advance control means including a stop element movable into a first position at an intermediate locality in said path of reciprocation to intercept and arrest the motion of said reciprocating member at said intermediate locality thereby limiting reciprocation of said member to a restricted range of motion less than said maximum range of motion and movable to a second position out of said path permitting reciprocation of said member through said maximum range of motion; and means for moving said stop element between said first and second positions thereof; the values of said restricted and maximum ranges of motion of said member being selected to provide step advance of said medium through distances respectively equal to the distances between a first integral number and a second, larger integral number of code bit groups on said medium.

3. In apparatus for translating information from an elongated web-from recording medium having said information coded thereon in groups of code bits regularly spaced by groups along the longitudinal dimension of said medium, structure for advancing said medium past a reading locality to bring code bit groups of said medium successively into register with said locality, said structure comprising, in combination, a reciprocating member having a maximum range of motion in a path of reciprocation for moving said medium stepwise past said reading locality; medium-engaging means driven by said reciprocating member for effecting step advance of said medium past said reading locality by a step value proportional to the range of motion of said member in each reciprocal cycle thereof; advance control means including a stop element movable into a first position at an intermediate locality in said path of reciprocation to intercept and arrest said reciprocating member at said intermediate locality thereby limiting reciprocation of said member to a restricted range of motion less than said maximum range of motion and movable to a second position out of said path permitting reciprocation of said member through said maximum range of motion; cyclically operating drive means engaging said reciprocating member for driving said member through said maximum range of motion once during each cycle of operation of said drive means, said member being disengageable from said drive means during portion of the cycle of operation thereof by arrest of said member by said stop element in said first position; and means for moving said stop element between said first and second positions thereof; the values of said restricted and maximum ranges of motion of said member being selected to provide step advance of said medium through distances respectively equal to the distances between a first integral number and a second, larger integral number of code bit groups on said medium.

4. In apparatus for translating information from an elongated web-form recording medium having said information coded thereon in groups of code bits regularly spaced by groups along the longitudinal dimension of said medium, structure for advancing said medium past a reading locality to bring code bit groups of said medium successively into register with said locality, said structure comprising, in combination, a reciprocating member having a maximum range of motion in a path of reciprocation for moving said medium stepwise past said reading locality; medium-engaging means driven by said reciprocating member for effecting step advance of said medium past said reading locality by a step value proportional to the range of motion of said member in each reciprocal cycle thereof; advance control means including a stop element movable into a first position at an intermediate locality in said path of reciprocation to intercept and arrest said reciprocating member at said intermediate locality thereby limiting reciprocation of said member to a restricted range of motion less than said maximum range of motion and movable to a second position out of said path permitting reciprocation of said member through said maximum range of motion; and means, including electrically energizable actuating means and a displaceable stop-element-engaging member operatively associated therewith, for moving said stop element between said first and second positions thereof in response to energization and de-energization of said actuating means; the values of said restricted and maximum ranges of motion of said reciprocating member being selected to provide step advance of said medium through distances respectively equal to the distances between a first integral number and a second, larger integral number of code bit groups on said medium.

5. In apparatus for translating information from an elongated web-form recording medium having said information coded thereon in groups of code bits regularly spaced by groups along the longitudinal dimension of said medium, structure for advancing said medium past a reading locality to bring code bit groups of said medium successively into register with said locality, said structure comprising, in combination, a reciprocating member having a maximum range of motion in a path of reciprocation for moving said medium stepwise past said reading locality; medium-engaging means driven by said reciprocating member for effecting step advance of said medium past said reading locality by a step value proportional to the range of motion of said member in each reciprocal cycle thereof; advance control means including a stop element movable into a first position at an intermediate locality in said path of reciprocation to intercept and arrest said reciprocating member at said intermediate locality thereby limiting reciprocation of said member to a restricted range of motion less than said maximum range of action and movable to a second position out of said path permitting reciprocation of said member through said maximum range of motion; cyclically operating drive means engaging said reciprocating member for driving said member through said maximum range of motion once during each cycle of operation of said drive means, said member being disengageable from said drive means during a portion of the cycle of operation thereof by arrest of said member by said stop element in said first position; and means, including electrically energizable actuating means and a displaceable stop-element-engaging member operatively associated therewith, for moving said stop element between said first and second positions thereof in response to energization and deenergization of said actuating means; the values of said restricted and maximum ranges of action of said reciprocating member being selected to provide step advance of said medium through distances respectively equal to the distances between successive code bit groups and alternate code bit groups on said medium.

6. In apparatus for translating information from an elongated web-form recording medium having said information coded thereon in groups of code bits regularly spaced by groups along the longitudinal dimension of said medium, structure for advancing said medium past a reading locality to bring code bit groups of said medium successively into register with said locality, said structure comprising, in combination, a rotatably mounted ratchet wheel bearing regularly spaced peripheral teeth; a reciprocating pawl member having a maximum range of motion and disposed to engage said teeth of said ratchet wheel for effecting step rotation of said ratchet wheel; medium-engaging means driven by said ratchet wheel for effecting step advance of said medium past said reading locality by a step value proportional to the range of motion of said pawl member in each reciprocal cycle thereof; a lever having a first end secured to said pawl member and a second cam-follower end and pivotally mounted at a pivot point intermediate said first and second ends; a driven cam disposed to engage said cam follower end for effecting pivotal movement of said lever about said pivot point thereby to reciprocate said pawl member; advance control means including a stop element movable into a first position to intercept and arrest pivotal movement of said first end of said lever at a locality for disengaging said cam follower end from said cam during a portion of the cam cycle and thereby limiting reciprocation of said pawl member to a restricted range of motion less than said maximum range of motion and movable to a second position permitting reciprocation of said pawl member through said maximum range of motion; and means for moving said stop element between said first and second positions thereof; the values of said restricted and maximum ranges of motion of said pawl member being selected to provide step advance of said medium through distances respectively equal to the distances between a first integral number and a second, larger integral number of code bit groups on said medium.

7. In apparatus for translating information from an elongated web-form recording medium having said information coded thereon in groups of code bits regularly spaced by groups along the longitudinal dimension of said medium, structure for advancing said medium past a reading locality to bring code bit groups of said medium successively into register with said locality, said structure comprising, in combination, a rotatably mounted ratchet wheel bearing regularly spaced peripheral teeth; a reciprocating pawl member having a maximum range of motion and disposed to engage said teeth of said ratchet wheel for effecting step rotation of said ratchet wheel; medium-engaging means driven by said ratchet wheel for effecting step advance of said medium past said reading locality by a step value proportional to the range of motion of said member in each reciprocal cycle thereof; a lever having a first end secured to said pawl member and a second cam-follower end and pivotally mounted at a pivot point intermediate said first and second ends; a driven cam disposed to engage said cam follower end for effecting pivotal movement of said lever about said pivot point thereby to reciprocate said pawl member; advance control means including a stop element movable into a first position to intercept and arrest pivotal movement of said first free end of said lever at a locality for disengaging said cam follower end from said cam during a portion of the cam cycle and thereby limiting reciprocation of said member to a restricted range of motion less than said maximum range of motion and movable to a second position permitting reciprocation of said pawl member through said maximum range of motion; and means, including electrically energizable actuating means and a displaceable stop-element-engaging member operatively associated therewith, for moving said stop element between said first and second positions thereof in response to energization and de-energization of said actuating means; the values of said restricted and maximum ranges of motion of said pawl member being selected to provide step advance of said medium through distances respectively equal to the distances between successive code bit groups and alternate code bit groups on said medium.

References Cited

UNITED STATES PATENTS

| | | | |
|---|---|---|---|
| 2,927,158 | 3/1960 | Blodgett. | |
| 2,980,307 | 4/1961 | Crane | 226—135 |
| 3,281,037 | 10/1966 | Young | 226—139 X |

FOREIGN PATENTS

| | | |
|---|---|---|
| 874,898 | 8/1961 | Great Britain. |

M. HENSON WOOD, Jr., *Primary Examiner.*

J. N. ERLICH, *Assistant Examiner.*